United States Patent [19]

Nodelman et al.

[11] Patent Number: 5,714,565
[45] Date of Patent: Feb. 3, 1998

[54] HEAT RESISTANT STRUCTURAL RIM PRODUCT

[75] Inventors: Neil H. Nodelman, Upper St. Clair; David D. Steppan, Gibsonia, both of Pa.

[73] Assignee: Bayer Corporation, Pittsburgh, Pa.

[21] Appl. No.: 580,228

[22] Filed: Dec. 28, 1995

Related U.S. Application Data

[63] Continuation-in-part of Ser. No. 399,792, Mar. 7, 1995, abandoned.

[51] Int. Cl.$^6$ .................................................. C08G 18/16
[52] U.S. Cl. ........................ 528/74.5; 528/45; 528/52; 528/56; 528/57; 528/73; 524/770
[58] Field of Search .......................... 528/74.5, 73, 45, 528/52, 56, 57; 524/770

[56] References Cited

U.S. PATENT DOCUMENTS

| | | | |
|---|---|---|---|
| 4,070,416 | 1/1978 | Narahara et al. | 260/830 P |
| 4,129,554 | 12/1978 | Karasawa et al. | 528/48 |
| 4,251,638 | 2/1981 | Reischl | 521/128 |
| 4,728,676 | 3/1988 | Müller et al. | 521/107 |
| 4,788,224 | 11/1988 | Müller et al. | 521/104 |
| 5,021,536 | 6/1991 | Müller et al. | 528/73 |
| 5,071,939 | 12/1991 | Fukami et al. | 528/53 |
| 5,073,576 | 12/1991 | Kuyzin et al. | 521/99 |
| 5,084,544 | 1/1992 | Müller et al. | 528/73 |
| 5,223,598 | 6/1993 | Yamada et al. | 528/48 |

OTHER PUBLICATIONS

Saunders & Frisch; *Polyurethanes*; Part I; 1962; p. 314.
Trade bulletin entitled "2,4-Pentanedione" from Union Carbide Specialty Chemicals Division, (see p. 15) Apr., 1989.

*Primary Examiner*—Rachel Gorr
*Attorney, Agent, or Firm*—Joseph C. Gil; Noland J. Cheung

[57] ABSTRACT

The present invention is directed to a heat resistant product prepared by reacting a) a mixture of i) an organic polyisocyanate, ii) an epoxide group containing compound, and iii), optionally, an organic compound containing an active methylene group and containing at least one electron withdrawing group adjacent to the methylene carbon, and b) at least one polyol which is free of any tertiary amine groups, with the reaction being conducted at an NCO:OH equivalent ratio of from 2:1 to 5:1. The reaction is conducted in the presence of a tertiary amine-free isocyanurate catalyst selected from the group consisting of oxides, alkoxides, hydroxides and carboxylates of alkali metals, alkaline earth metals, transition metals and quaternary ammonium.

8 Claims, No Drawings

HEAT RESISTANT STRUCTURAL RIM PRODUCT

CROSS REFERENCED TO RELATED APPLICATION

This application is a Continuation-In-Part of U.S. Ser. No. 08/399,792, filed on Mar. 7, 1995, now abandoned.

BACKGROUND OF THE INVENTION

Reaction injection molding (RIM) has become an important process for the manufacture of a wide variety of moldings. The RIM process is a process which involves the intimate mixing of a polyisocyanate component and an isocyanate-reactive component followed by the injection (generally under high pressure) of the mixture into a mold with subsequent rapid curing.

In the automotive industry, the application of RIM technology has been primarily to produce vertical parts (e.g. fenders and fascias) and has typically not been used in the production of horizontal body parts (e.g., trunks, hoods and roofs). In order to be useful for the production of horizontal body parts, the molded product 1) must have high stiffness, 2) must have a high quality surface, and 3) must be able to withstand the heat generated during further processing of the part (e.g., painting and curing the paint). Typically, such a part must have a flexural modulus of 750,000 psi or higher.

Products to be used in many automotive applications, and particularly so-called structural RIM ("SRIM") parts, must be able to withstand the extreme conditions of the known electrodeposition process used to paint (or prime) and rustproof automotive parts. Typically, parts must be able to survive two hours in a 400° F. oven (i.e., about 204° C.) without forming blisters or internal cracks. Commercially available structural RIM parts are not able to withstand these conditions.

Thermosetting resin systems based upon isocyanates, epoxides and suitable catalysts are known. U.S. Pat. No. 4,070,416 describes the preparation of resins by mixing a polyfunctional isocyanate with a polyfunctional epoxide, and then carrying out a polymerization reaction in the presence of a nitrogen containing isocyanurate catalyst. U.S. Pat. No. 4,728,676 describes a thermosetting reactive resin mixture of an organic polyisocyanate, a polyepoxide, and a heat activatable catalyst. U.S. Pat. No. 4,788,224 describes a two stage process for preparing a molded product. In the first stage, an organic polyisocyanate is reacted with an organic compound containing at least two epoxide groups in the presence of a tertiary amine catalyst. The reaction is stopped by adding a latent heat activatable catalyst to the product. The mixture is then heated in a mold to complete the crosslinking reaction. U.S. Pat. No. 5,084,544 describes a reactive mixture of a polyisocyanate, an epoxide and a specified amine catalyst.

U.S. Pat. No. 5,021,536 describes a storage stable reaction mixture of an organic polyisocyanate, a polyepoxide, and an alkylating agent that inhibits the reaction of the polyisocyanate and polyepoxide. The '536 patent indicates that hydroxyl compounds having molecular weights of from 62 to 2000 can also be added. U.S. Pat. No. 4,129,554 describes a thermosettable composition comprising a polyepoxide and a polyisocyanate stabilized by incorporating either a quinone or an organic compound containing an active methylene group and containing at least one electron withdrawing group adjacent to the methylene carbon.

U.S. Pat. No. 5,071,939 and 5,073,576 describe SRIM (i.e., structural reaction injection molding) based upon iso- cyanurate formation. The '939 patent describes a product prepared from an organic polyisocyanate, a 40 to 400 OH polyol and a trimerization (i.e., isocyanurate) catalyst. The catalyst described is a co-catalyst of a tertiary amine and an epoxy compound. From the examples, it is apparent that the co-catalyst can be prepared by blending the isocyanate with the epoxide and reacting the blend with a polyol/amine catalyst mixture. The '576 patent describes an SRIM system prepared from an isocyanate, an isocyanate-reactive component (which must contain at least 50% by weight of a tertiary amine polyol), and an isocyanurate catalyst.

U.S. Pat. No. 5,223,598 describes a heat-curable system based upon i) a polyisocyanate and ii) a mixture of a polyol, a polyepoxide and a curing agent. Among the curing agents listed are tertiary amines, sodium methoxide, lead napthenate and quaternary ammonium halides. The preferred curing agents are tertiary amines.

Finally, it is known that mixtures of methylenebis(phenylisocyanate) and epoxy resins are stable for more than 200 days at 60° C. when 0.01 weight percent of 2,4-pentanedione is added, compared with only 15 days in the absence of the dione (see page 15 of the trade bulletin entitled "2,4-PENTANEDIONE" from Union Carbide, Specialty Chemicals Division).

The present invention relates to an improved composition for the production of SRIM molded parts. In general, the molded parts are produced by placing a reinforcing mat inside a mold cavity, closing the mold, introducing a reaction mixture into the mold, allowing the components to react, and removing the product from the mold.

DESCRIPTION OF THE INVENTION

The present invention is directed to a heat resistant SRIM product which is able to survive two hours in a 400° F. (i.e., about 204° C.) oven without forming blisters or internal cracks. The product is prepared by reacting:
a) a mixture of
  i) an organic polyisocyanate,
  ii) an organic compound containing at least one epoxide group, the weight ratio of component a)i) to a)ii) being from 80:20 to 99:1, and
  iii) from 0 to 0.5, and preferably from 0.01 to 0.5 percent by weight, based upon the total weight of component a) of an organic compound containing an active methylene group and containing at least one electron withdrawing group adjacent to the methylene carbon, and
b) at least one polyol having a hydroxyl functionality of from 3 to 8, having an OH number of from 90 to 1850, and being free of any tertiary amines, the reaction being conducted at an NCO:OH equivalent ratio of from 2:1 to 5:1, in the presence of
c) a catalytic amount of a tertiary amine-free isocyanurate catalyst selected from the group consisting of oxides, alkoxides, hydroxides and carboxylates of alkali metals, alkaline earth metals, transition metals and quaternary ammonium.

The present invention requires the use of four specific components: 1) an organic polyisocyanate, 2) an organic compound containing at least one epoxide group, 3) a tertiary amine-free polyol, and 4) a tertiary amine-free isocyanurate catalyst.

a)i) Organic Polyisocyanates

Starting polyisocyanate components for use in the present invention are known and include aliphatic, cycloaliphatic, araliphatic, aromatic and heterocyclic polyisocyanates of the type described, for example, by W. Siefken in Justus Liebigs Annalen der Chemie, 562, pages 72 to 136. Specific examples of useful isocyanates include ethylene diisocyanate; 1,4-tetra-methylene diisocyanate; 1,6-hexa-methylene diisocyanate; 1,12-dodecane diisocyanate; cyclobutane-1,3-diisocyanate; cyclohexane-1,3- and -1,4-diisocyanate and mixtures of these isomers. Additional examples are 1-isocyanato-3,3,5-trimethyl-5-isocyanatomethyl cyclohexane (German Auslegeschrift 1,202,785, U.S. Pat. No. 3,401,190), 2,4- and 2,6-hexahydrotolylene diisocyanate and mixtures of these isomers. Hexa-hydro-1,3- and/or -1,4-phenylene diisocyanate; perhydro-2,4'- and/or-4,4'-diphenylmethane diisocyanate; 1,3- and 1,4-phenylene diisocyanate; 2,4- and 2,6-tolylene diisocyanate and mixtures of these isomers are also suitable in the instant invention. Diphenyl-methane-2,4'- and/or-4,4'-diisocyanate; naphthylene-1,5-diisocyanate; triphenyl methane-4,4',4''-triisocyanate; polyphenyl polymethylene polyisocyanates of the type obtained by condensing aniline with formaldehyde, followed by phosgenation and described, for example, in British patents 874,430 and 848,671 may also be used in the present invention; m- and p-isocyanatophenylsulfonyl isocyanates according to U.S. Pat. No. 3,454,606; perchlorinated aryl polyisocyanates of the type described, for example, in German Auslegeschrift 1,157,601 (U.S. Pat. No. 3,277,138); polyisocyanates containing carbodiimide groups of the type described in German Patent 1,902,007 (U.S. Pat. No. 3,152,162); diisocyanates of the type described in U.S. Pat. No. 3,492,330; and polyisocyanates containing allophanate groups of the type described, for example, in British Patent 993,890, in Belgian Patent 761,626 and in published Dutch Patent Application 7,102,524 are still further examples of suitable isocyanates. Additionally, polyisocyanates containing isocyanurate groups of the type described, for example, in U.S. Pat. No. 3,001,973; in German Patents 1,022,789; 1,222,067 and 1,027,394 and in German Offenlegungsschriften 1,929,034 and 2,004,408; polyisocyanates containing urethane groups of the type described, for example, in Belgian Patent 752,261 or in U.S. Pat. No. 3,394,164; polyisocyanates containing acrylated urea groups according to German Patent 1,230,778 and polyisocyanates containing biuret groups of the type described, for example, in German Patent 1,101,394 (U.S. Pat. Nos. 3,124,605 and 3,201,372) and in British Patent 889,050 are also suitable.

Polyisocyanates produced by telomerization reactions of the type described, for example, in U.S. Pat. No. 3,654,106; polyisocyanates containing ester groups of the type described for example, in British Patents 965,474 and 1,072,956, in U.S. Patent 3,567,763 and in German Patent 1,231,688; reaction products of the above-mentioned isocyanates with acetals according to German Patent 1,072,385 and polyisocyanates containing polymeric fatty acid residues, according to U.S. Pat. No. 3,455,883 are still further examples of suitable isocyanates.

Aromatic polyisocyanates which are liquid at the processing temperature are preferably used. The particularly preferred starting polyisocyanates include derivatives of 4,4'-diisocyanato-diphenylmethane which are liquid at room temperature, for example, liquid polyisocyanates containing urethane groups of the type obtainable in accordance with U.S. Pat. No. 3,644,457). These may be produced for example, by reacting 1 mol of 4,4'-diisocyanato-diphenylmethane with from 0.05 to 0.3 moles of low molecular weight diols or triols, preferably polypropylene glycols having a molecular weight below 700. Also useful are diisocyanates based on diphenylmethane diisocyanate containing carbodiimide and/or uretone imine groups of the type obtainable, for example, in accordance with U.S. Pat. No. 3,152,162. Mixtures of these preferred polyisocyanates can also be used. In general, aliphatic and cycloaliphatic isocyanates are less suitable for the purposes of the instant invention.

Also preferred are the polyphenyl-polymethylene polyisocyanates obtained by the phosgenation of an aniline/formaldehyde condensate.

a)ii) Organic Epoxides

Useful epoxide group containing compounds (which may be liquid) include any aliphatic, cycloaliphatic, aromatic or heterocyclic compounds having at least one epoxide group, preferably at least one 1,2-epoxide group. The preferred epoxides have from about 1 to 4, and preferably about 2, epoxide groups per mole and an epoxide equivalent weight of from about 90 to about 500, and preferably from about 170 to about 220.

Specific examples of suitable polyepoxides include: polyglycidyl ethers of polyhydric phenols such as pyrocatechol, resorcinol, hydroquinone, 4,4'-dihydroxydiphenylmethane, 4,4'-dihydroxy-3,3'-dimethyldiphenylmethane, bisphenol A, 4,4'-dihydroxydiphenyl-cyclohexane, 4,4'-dihydroxy-3,3'-dimethyldiphenyl-propane, 4,4'-dihydroxydiphenyl, 4,4'-dihydroxydiphenylsulfone, tris-(4-hydroxylphenyl)-methane, the chlorination and bromination products of the above-stated diphenols, novolacs (i.e. from the reaction products of mono- or poly-hydric phenols with aldehydes, in particular formaldehyde, in the presence of acid catalysts), diphenols obtained by the esterification of 2 moles of the sodium salt of an aromatic oxycarboxylic acid with one mole of a dihaloalkane or dihalodialkyl ether (See British Patent 1,017,612) and polyphenols obtained by the condensation of phenols and long-chain haloparaffins containing at least two halogen atoms (See British Patent 1,024,288).

Other epoxides useful in the practice of the present invention are glycidyl esters of polybasic aromatic, aliphatic and cycloaliphatic carboxylic acids such as phthalic acid diglycidyl ester and adipic acid diglycidyl ester; glycidyl esters of the reaction products of 1 mole of an aromatic or cycloaliphatic dicarboxylic acid anhydride with ½ mole of a diol or 1/n mole of a polyol with n hydroxyl groups; and hexahydro-phthalic acid diglycidyl ester which may optionally be substituted with methyl groups.

Glycidyl ethers of polyhydric alcohols such as 1,4-butanediol, glycerol, trimethylolpropane, pentaerythritol and polyethylene glycols may also be used. Triglycidyl isocyanurate, N,N'-diepoxypropyl-oxamide, polyglycidyl thioethers prepared from polyhydric thiols (e.g., bis-mercaptomethylbenzene or diglycidyltrimethylenesulfone), and polyglycidyl ethers based on hydantoins are also useful in the practice of the present invention.

The epoxidation products of polyunsaturated compounds such as vegetable oils and their transformation products; epoxidation products of di- and polyolefins, such as butadiene, vinylcyclohexene, 1,5-cyclooctadiene, and 1,5,9-cyclododecatriene; polymers and copolymers which still contain epoxidizable double bonds such as those based on polybutadiene, polyisoprene, butadiene/styrene copolymers, divinylbenzene, dicyclopentadiene, unsaturated polyesters; epoxidation products of olefins which are obtainable by Diels-Alder addition and are subsequently converted into polyepoxides, or of compounds which contain two cyclopentene or cyclohexene rings linked by bridging atoms or atomic groups may be used in the practice of the present invention. Polymers of unsaturated monoepoxides such as those prepared from methacrylic acid glycidyl ester or allyl glycidyl ether may also be used.

The following polyepoxide compounds or mixtures thereof are preferably used in the practice of the present invention: polyglycidyl ethers of polyhydric phenols, in particular of bisphenol A; polyglycidyl esters prepared from cycloaliphatic dicarboxylic acids, in particular hexahydrophthalic acid diglycidyl ester; and 3,4-epoxycyclohexylmethane-3,4-epoxycyclohexane carboxylate.

Phenoxypropylene oxide, styrene oxide and glycidyl alcohol are examples of suitable monoepoxides.

a)iii) Active Methylene Group Containing Organic Compound

The organic compounds which contain an active methylene group and contain at least one electron withdrawing group adjacent to the methylene carbon are known and described, e.g., in U.S. Pat. No. 4,129,554, the disclosure of which is herein incorporated by reference. Specific useful compounds include cyanoacetic acid, cyanoacetate methyl ester, cyanoacetate ethyl ester, cyanoacetate propyl ester, cyanoacetate butyl ester, α-cyanoacetamide, α-cyanoacetanilide, malononitrile, nitroacetic acid, nitroacetate methyl ester, nitroacetate ethyl ester, nitroacetate propyl ester, nitroacetate butyl ester, dinitromethane, nitroacetone, nitrochloromethane, formyl acetic acid, formyl acetate ethyl ester, formyl acetone, acetyl acetone (i.e., 2,4-pentane dione), malonate dimethyl ester, malonate diethyl ester, malonate dipropyl ester, malonate dibutyl ester, acetoacetate methyl ester, acetoacetate ethyl ester, acetoacetate propyl ester and acetoacetate butyl ester. 2,4-pentane dione is presently preferred.

b) Polyols

Useful polyols herein have hydroxyl functionalities of from 3 to 8, have OH numbers of from 90 to 1850, and are free of any tertiary amines. Examples of suitable compounds include the relatively low molecular weight (i.e., having number average molecular weights of from about 90 to about 1850) hydroxy functional compounds, polyesters, polyethers, polythioethers, polyacetals and polycarbonates containing from 3 to 8 and most preferably 3 or 4 hydroxyl groups of the type known for the production of polyurethanes. Caster oil is presently preferred. Also preferred are polyols containing less than two moles of alkylene oxide (ether) per hydroxyl group.

The polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of $BF_3$ or potassium hydroxide, or by chemically adding these epoxides, preferably ethylene oxide and propylene oxide, in admixture or successively to compounds containing at least three and no more than eight hydroxyl groups. Examples of such compounds include glycerol, trimethylol propane, sorbitol, pentaerythritol, sucrose, and the like. The compounds themselves (i.e., without alkylene oxide modification) can also be used provided they have the required OH numbers.

Suitable examples of useful polyesters include the reaction products of polyhydric alcohols with polyvalent carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. No. 4,098,731 and 3,726,952, herein incorporated by reference in their entirety. Suitable polythioethers, polyacetals, polycarbonates and other polyhydroxyl compounds are also disclosed in the above-identified U.S. patents. Finally, representatives of the many and varied compounds which may be used in accordance with the invention may be found for example in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

The amount of polyol and isocyanate used is such that the NCO:OH equivalent ratio is from 2:1 to 5:1.

c) Tertiary Amine-Free Isocyanurate Catalyst

The reaction mixture must also contain a tertiary amine-free isocyanurate catalyst selected from the group consisting of oxides, alkoxides, hydroxides and carboxylates of alkali metals, alkaline earth metals, transition metals and quaternary ammonium. The amount of catalyst used is generally from about 0.1 to about 10% by weight, and preferably from about 0.5 to about 5% by weight, based on the total weight of the hydroxy-functional components of the reaction mixture. The tertiary amine-free isocyanurate catalysts (i.e., catalysts which promote the polymerization reaction of isocyanate groups) are known in the art. The catalysts used in the present invention are oxides, alkoxides, hydroxides and carboxylates of alkali metals (i.e., Group I metals), alkaline earth metals (i.e., Group II metals), transition metals (i.e., Fe, Hg, Ni, Co, Zn, Cr and Ti) and quaternary ammonium. Suitable specific catalysts sodium hydroxide, potassium hydroxide, sodium methoxide, potassium methoxide, potassium t-butoxide, calcium oxide, magnesium oxide and benzyl trimethylammonium hydroxide. Preferred catalysts are carboxylates such as potassium octoate, potassium acetate, sodium acetate, potassium adipate, sodium benzoate, trimethyl-N-hydroxypropyl ammonium octoate and trimethyl-N-hydroxy-propyl ammonium formate.

Examples of commercially available trimerization catalysts include potassium organo-salt catalysts sold as Dabco K-15 and Dabco T-45 from Air Products, Hexchem 977 from Hexchem, Polycat 46 from Air Products and Pel-Cat 9540A from Ele, Dabco TMR (N-hydroxypropyl trimethyl ammonium octoate) and Dabco TMR 2 (N-hydroxypropyl trimethyl ammonium formate) from Air Products.

The reaction mixtures are generally prepared by first preblending the isocyanate (component a)i)), the epoxy compound (component a)ii) and component a)iii) to form an "A-side". The polyol(s) (component b)) and the catalysts (component c)) are then blended to form a "B-side". The two sides are then mixed and reacted.

The molded parts are generally produced by placing a reinforcing mat inside a mold cavity, closing the mold, introducing the reaction mixture into the mold, allowing the components to react, and removing the product from the mold. The amount of glass reinforcing mat can vary over wide limits and is typically used in an amount of from about 10 to about 60% by weight based upon the total weight of the reaction mixture. The glass mats useful herein are known in the art and include chopped strand mats, continuous strand mats and surfacing mats (i.e., glass veils).

In addition, other additives typically used in the urethane art can be added. Such known additives include flame retardants, plasticizers (such as, e.g., dioctyl phthalate), colorants, fillers (such as, e.g., calcium carbonate and talc), internal mold release agents (such as, e.g., zinc carboxylates and silicone release agents), silicone surfactants and the like.

The invention is further illustrated but is not intended to be limited by the following examples in which all parts and percentages are by weight unless otherwise specified.

EXAMPLES

In the examples, the following materials were used:

POLYOL A: a glycerin/propylene oxide adduct having an OH number of 1050.

POLYOL B: a trimethylol propane/propylene oxide adduct having an OH number of 550.

POLYOL C: a monoethanolamine/propylene oxide adduct having an OH number of 700.

CASTOR OIL: DB Oil, a refined grade of castor oil, commercially available from CasChem, (having an OH number of 164, an acid number of 0.6 and a saponification value of 180); DB oil is a triglyceride of a mixture fatty acids, 90% of the acid mixture is ricinoleic acid and 7% is oleic and linoleic acids.

BAYLITH L: a commercially available potassium sodium aluminosilicate zeolite composition available from Bayer AG, Germany.

EPOXIDE: Epon 828, a commercially available diglycidyl ether of bisphenol A from Shell (epoxy equivalent of from 185–192).

2,4-PD: 2,4-pentanedione.

PCAT 9: Polycat 9, a tris(dimethyl aminopropyl)amine available from Air Products.

K-15: Dabco K-15, a 70% by weight solution of potassium octoate in diethylene glycol, available from Air Products.

TMR: Dabco TMR, N-hydroxypropyl trimethyl ammonium octoate, available from Air Products.

TAB: a mixture of 5 parts by weight of tetra-n-butylammonium bromide and 0.1 part of dibutyltin dilaurate (comparison catalyst).

ISO: Mondur MR-5, a commercially available polymethylene poly(phenyl isocyanate) from Miles Inc., having an isocyanate group content of 32.5% and a Brookfield viscosity at 25° C. of 50 mPa·s.

Systems were first handcast on a 6 inch×6 inch×⅛ inch (15 cm×15 cm×0.3125 cm) aluminum mold heated to 70° C. and demolded after 2 minutes. The molded parts were either not post-cured or they were post-cured at 120° C. for 1 hour and then 150° C. for 2 hours. As shown, it was found that post-curing had no effect on whether the molded part survived the baking test.

Two different polyol blends were prepared by mixing the following ingredients:

| Polyol Blend 1 | Polyol Blend 2 (Comparative) |
| --- | --- |
| Polyol A 10 pbw | Polyol C 50 pbw |
| Polyol B 50 pbw | Castor Oil 50 pbw |
| Castor Oil 40 pbw | Baylith L 3 pbw |
| Baylith L 3 pbw | |

Isocyanate 1 was ISO, while Isocyanate 2 was prepared by mixing 90 pbw of ISO, 10 pbw of Epoxide and 0.05 pbw of 2,4-PD. When used, PCAT 9 (Comparative) was added to the particular polyol blend in an amount of 4 pbw per 100 pbw of polyol blend. When used, K-15 was added to the particular polyol blend in an amount of 4 pbw per 100 pbw of polyol blend. When used, TMR was added to the particular polyol blend in an amount of 2 pbw per 100 pbw of polyol blend. All formulations were run at an isocyanate index of 300. The various molded parts were then held in an oven at 400° F. (about 204° C.) for 2 hours.

Parts that passed had no cracking. Parts that failed had cracks over at least 50% of the surface area. The various formulations and results were as indicated in Table 1.

TABLE 1

| | | | Results | |
| --- | --- | --- | --- | --- |
| Isocyanate | Polyol Blend | Catalyst | Post-cured | Not post-cured |
| 2 | 1 | PCAT-9 | Failed | Failed |
| 2 | 1 | K-15 | Passed | Passed |
| 2 | 1 | TMR | Passed | Passed |
| 1 | 1 | TMR | Failed | Failed |
| 2 | 2 | PCAT-9 | Failed | Failed |
| 2 | 2 | TMR | Failed | Failed |
| 1 | 2 | TMR | Failed | Failed |
| 2 | 1 | TAB | Failed | Failed |

The third formulation in Table 1 (i.e., Isocyanate 2, Polyol Blend 1 and TMR) was run on a KM-245 RIM machine with and without glass mat reinforcement (10 oz./sq. ft of M8610 available from Owens Corning). The mold used was a 15 inch by 15 inch by 0.125 inch steel mold. The temperatures of both the Polyol Blend and the isocyanate were 90° F. The feed rate of the reaction mixture was 267 g/sec. The mold temperature was 175° F, and the mold was first sprayed with CT-2006 wax, commercially available from Chemtrend. The gel time of the system was 34 seconds and the demold time was 2 minutes. The properties of the molded products were as follows:

| | Unreinforced | Reinforced | ASTM Test |
| --- | --- | --- | --- |
| Density, lb/ft$^3$ | 76.5 (1.22 g/cc) | 104.9 (1.68 g/cc) | D1622 |
| Tensile strength lb/in$^2$ | 8,050 (65 N/mm$^2$) | 30,850 (216 N/mm$^2$) | D638 |
| Elongation, % | 1.9 | 2.1 | D638 |
| Flex. modulus lb/in$^2$ | 530,000 (3,710 N/mm$^2$) | 2,197,000 (15,379 N/mm$^2$) | D790 |
| HDT, °F. | 374 (190° C.) | >428 (220° C.) | D648 |

The reinforced parts were either post-cured for 1 hour at 400° F. (204° C.) or not post-cured. The parts were subjected to a 400° F. (204° C.) bake for two hours after 48 hours, 1 week, 2 weeks, 3 weeks and 4 weeks of aging at ambient temperature and humidity. The non-post-cured parts blistered only after 4 weeks aging. The post-cured parts showed signs of whitening of the glass fiber at the surface, but never blistered.

After a post-cured part was aged for 7 weeks at ambient temperature and humidity, it was subjected to drying at 200° F. (93° C.) for 2 hours and then baked at 400° F. (204° C.) for two hours. The part showed no sign of fiber whitening or blistering.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A heat resistant product prepared by reacting
   a) a mixture of
      i) an organic polyisocyanate,
      ii) an organic compound containing at least one epoxide group, the weight ratio of component a)i) to a)ii) being from 80:20 to 99:1, and
      iii) from 0 to 0.5 percent by weight, based upon the total weight of component a) of an organic compound containing an active methylene group and containing at least one electron withdrawing group adjacent to the methylene carbon, and b) at least one polyol having a hydroxyl functionality of from 3 to 8, having an OH number of from 90 to 1850, and being free of any tertiary amine groups, the reaction being conducted at an NCO:OH equivalent ratio of from 2:1 to 5:1, in the presence of c) a catalytic amount of a tertiary amine-free isocyanurate catalyst selected from the group consisting of carboxylates of alkali metals, alkaline earth metals, transition metals and quarternary ammonium.

2. The product of claim 1, wherein component a)ii) contains from 1 to 4 epoxide groups and has an epoxide equivalent of from 90 to 520.

3. The product of claim 2, wherein component a)ii) contains about 2 epoxide groups and has an epoxide equivalent of from 170 to 220.

4. The product of claim 1, wherein component a) iii) is present in an amount of from 0.01 to 0.5 percent by weight.

5. The product of claim 4, wherein component a)iii) is 2,4-pentanedione.

6. The product of claim 5, wherein component b) is castor oil.

7. The product of claim 1, wherein component c) is present in an amount of from 0.1 to 10% by weight based upon the weight of component b).

8. The product of claim 6, wherein component c) is present in an amount of from 0.5 to 5% by weight based upon the weight of component b).

* * * * *